Figure 1:
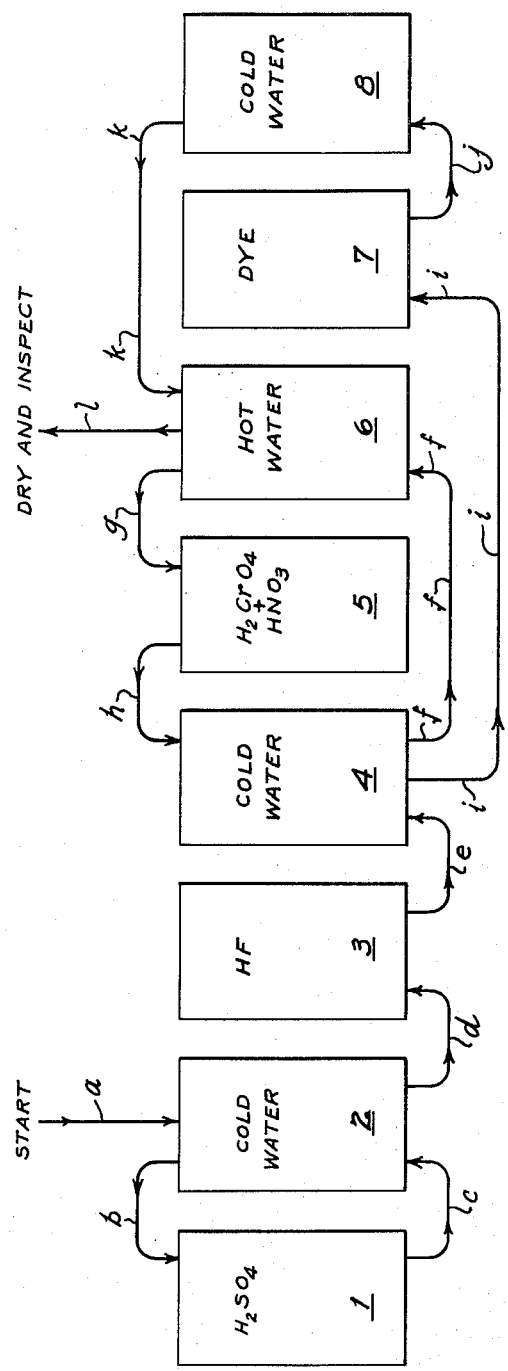

Nov. 8, 1960

J. V. MORGIA 2,959,471

ACID ETCH INSPECTION PROCESS

Filed Dec. 4, 1957

INVENTOR.
JAMES V. MORGIA
BY
Morgan, Finnegan, Durham & Pine
ATTORNEYS.

United States Patent Office 2,959,471
Patented Nov. 8, 1960

2,959,471

ACID ETCH INSPECTION PROCESS

James V. Morgia, Stratford, Conn., assignor to United Aircraft Corporation, East Hartford, Conn., a corporation of Delaware Filed Dec. 4, 1957, Ser. No. 700,627

6 Claims. (Cl. 23—230)

This invention relates to an improvement in the visual inspection of castings for gross defects therein.

Castings when made for use in aircraft equipment particularly, must be individually inspected to insure freedom from gross defects such as cracks, seams, porosity, cold shuts, oxide inclusions and shrinkage. Previous inspection methods cannot be carried out in normal light and are therefore restricted to certain areas in a plant or shop. They are also time-consuming. X-ray inspection is not completely reliable where the casting in question is of an intricate design and complex configuration. X-ray inspection does not readily detect oxide inclusions, because of the small difference in density between the oxide and the metal itself. Cracks are sometimes missed unless the plane of the crack is parallel or almost parallel with the X-ray beam. The use of fluorescent penetrants has the disadvantage that the inspection must be carried out in semidarkness and using black light. Further difficulty is encountered in using fluorescent penetrants in that false indications of fault are caused by foreign substances adhering to the surfaces of the castings and by superficial knicks and scratches which are shown up thereby.

The etch penetrant method of my invention broadly consists in the etching of the casting to be tested by immersing it first in sulphuric acid, rinsing it, immersing it in chromic acid-nitric acid and hydrofluoric acid, separately or in combination, dipping it in water, draining it, immersing it in a solution of chromium-complexing dye which may contain a thickener, draining the casting, rinsing it in cold and then in hot water. Any flaws existing in the casting are now indicated by a precipitate of the dye and chromic acid.

My method for detecting flaws in a casting represents an advance over the methods in present use. It eliminates the need for X-ray devices, for shielding against exposure to the rays therefrom, and the apprehension some employees feel when working near an area where X-rays are used. There is no need to work other than in normal light, as is the case where fluorescent penetrants are used. There is no chance of missing a flaw as a result of the bleeding out of the penetrant, as is now the case with the penetrants used in the methods currently available. The penetrant, as a result of the method of the invention, does not bleed or run from the flaws. The etch penetrant method also involves a substantial saving in time over the X-ray or fluorescent penetrant inspection methods. It is usually carried out in a span of approximately ten minutes. This also results in a saving of time and materials in the foundry, since defective foundry practice is often the cause of certain flaws continually occurring in the casting, which practice may be corrected at an earlier point in the foundry-run than is possible with the methods of detection currently in use.

An object of this invention is to provide an improved method for the detection of flaws in castings.

Another object of this invention is to provide a method for the detection of flaws in castings whereby a quantitative indication of said flaws is obtained.

A further object of this invention is to provide a method for the detection of flaws in castings which is rapid and reliable.

A still further object of this invention is the elimination of special apparatus used in current methods for detecting flaws in castings.

Another object of this invention is the providing of a method for the detection of flaws in castings which gives a durable indication of such flaws.

Other objects, advantages and improvements will become apparent from the following description read in conjunction with the accompanying drawing:

Fig. 1 shows a flow diagram of the steps involved in the method of this invention.

Referring now specifically to Fig. 1 it will be observed that it shows a series of tanks used for the etching, rinsing and impregnation of the casting.

Tank 1 contains 4 to 5%-by-volume aqueous solution of 66° Baumé sulfuric acid.

Tank 2 contains cold water which is continuously changed.

Tank 3 contains an aqueous solution of hydrofluoric acid which contains 15 to 20% by weight of the pure acid.

Tank 4 contains cold water which is continuously changed.

Tank 5 contains an aqueous solution of from 24 to 33⅓% chromic acid ($CrO_3$) and from 0.5 to 1.5% of pure nitric acid by weight based upon the weight of water used.

Tank 6 contains water heated to a temperature in the range of 160° to 180° F.

Tank 7 contains a chromium-complexing dye solution maintained at a temperature in the range of 110° to 130° F. Methylene blue dye has proven satisfactory. Dyes containing an aromatic amine group, azo groups, amide groups, oxime groups and their salts also give coordination complex precipitates with chromic ions.

Tank 8 contains cold water which is continuously changed.

The lower case letters shown in Fig. 1 indicate the sequence of steps used in one embodiment of the invention.

The chemical solutions in the various tanks must be kept up to a minimum strength. The sulfuric acid bath depletes steadily during the inspection procedure depending upon the number and sizes of the castings tested. Test panels of the same metal or alloy used in the fabrication of the castings tested are used to insure the maintenance of the proper acid strength. When the time for etching the test panel to the extent of 0.004 to 0.005 inch on each surface becomes inconveniently long, a new solution is made. Fresh acid may be added to the original solution but it does not produce as satisfactory a result as a totally fresh acid bath. The other baths may be maintained within the ranges of concentration desired, by the addition to the solution of fresh concentrates of the depleted materials.

The steps involved in the process are as follows:

A clean casting, one free from oil, grease, or other foreign-surface coating, is immersed in cold water for a few seconds. This eliminates or minimizes any flash flame on immersion in the sulfuric acid bath due to the presence of fine metallic-base particles adhering to the surface of the casting. It is then immersed in the sulfuric acid bath, which is at room temperature, until 0.004 to 0.005 inch of metal are removed from each surface. This takes about thirty seconds to one minute. The casting is then subjected to a cold water rinse to remove the sulfuric acid. It is then immersed in the hydrofluoric acid bath for about two to three minutes. It is again rinsed in cold water but in a tank other than that used for the sulfuric acid rinse, since a trace of sulfates if picked up during this rinse would contaminate the subsequent chromic acid-nitric acid bath which in turn would cause a darkening of the castings. The rinsed casting is now heated by transferring it into a hot water bath for about from thirty seconds to one minute. This causes expansion of cracks and gas pockets so they will more readily take in the chromic acid-nitric acid solution when subsequently contacted therewith. The casting is immersed in the acid bath immediately upon being removed from the hot water, so it is hot when contacted with the chromic acid-nitric acid solution. The casting is allowed to soak in the acid bath for about from two to three minutes at room temperature. It is then removed and rinsed gently in a cold water rinsing tank. The cooled casting is now immersed for about from forty-five seconds to one minute in a chromium-complexing dye which forms a precipitate, with the chromic acid remaining in the flaws of the casting. The casting is now rinsed thoroughly in cold water, followed by a brief rinse in hot water. This last hot water dip removes any remaining trace of the dye and allows rapid drying of the casting. Flaws show up as sites of chromium complexing dye-chromic acid precipitates.

If the casting thus examined contains any flaw which breaks through to the surface, a build-up of the precipitate on the defect will indicate its presence. The amount of precipitate formed is an indication of the relative depth and size of the flaw.

The types of indications are as follows: Hot cracks appear as ragged lines of variable width having numerous branches. A cold crack appears as a straight line usually uninterrupted throughout its length. Cold shuts appear as distinct lines in bands of variable lengths. Micro-shrinkage appears as feathery streaks or irregular patches. Shrinkage porosity appears as a localized lacy or honey-combed area. Foreign materials appear as isolated irregular or elongated indications. Gas pockets appear as specks or dots depending upon their size. Oxide skins occur in a random fashion and are generally curly in appearance as contrasted to ragged-edge cracks.

The following example is set forth by way of illustration and not by way of limitation. The system of tanks shown in Fig. 1 is used.

A magnesium casting of AZ91 alloy, freed of any oil or grease and foreign bodies such as sand, oxide or dross, is dipped in cold water. The casting is then immersed in a 5% aqueous solution by volume of 66° Baumé sulfuric acid and kept there for thirty seconds. This causes the loss of 0.0049 inch of material from each surface of the casting. The casting is removed from the sulfuric acid bath and rinsed free of acid. The casting is then immersed in a 15%-by-weight aqueous solution of hydrofluoric acid for two minutes. This causes the casting to whiten by removing any surface discolorations. The casting is removed and rinsed in cold water. The rinsed casting is heated in a water bath to a temperature of 170° F. for one minute, and transferred to an acid bath made up of 75 lbs. of water, 24 lbs. of chromic acid ($CrO_3$), and 1 lb. of nitric acid, and allowed to remain there for two minutes. The casting is then dipped twice in cold water, which removes the acid adhering to the readily reached surface areas but does not disturb that which was absorbed into the flaws in the casting. The casting is then immersed in a solution of methylene blue at a temperature of 120° F., wherein there is dissolved 0.7 ounce of dye for each gallon of solution, and allowed to remain therein for one minute. The casting is then removed from the dye solution, thoroughly rinsed in cold water, rinsed briefly in hot water, dried and inspected. The flaws in the casting are shown up by the production of blue precipitates. All such precipitate indicators are readily observable to the unaided eye under conventional illumination.

It will be obvious to those skilled in the art that various changes may be made without departing from the spirit and scope of the invention as disclosed herein.

What is claimed is:

1. An improved method for the detection of imperfections in castings which comprises immersing the casting in aqueous sulphuric acid solution from 4 to 5% by volume of 66° Bé., rinsing the casting with water, immersing the casting in aqueous hydrofluoric acid from 15 to 20% by weight hydrogen fluoride, rinsing the casting with water, immersing the casting in an aqueous chromic acid-nitric acid solution consisting of from 24 to 33⅓% chromic acid by weight and from 0.5 to 1.5% nitric acid by weight based upon the amount of water used, rinsing the casting with water, immersing the casting in a chromium complexing dye, allowing a colored precipitate to form as a result of the reaction between the chromic acid-nitric acid solution and the chromium complexing dye, rinsing the casting with water, drying the casting and inspecting the casting for the colored precipitate which would mark said imperfections.

2. An improved method for the inspection of castings for imperfections as set forth in claim 1 wherein the chromium complexing dye is methylene blue in a range from 0.6 to 0.8 ounce per gallon of solution.

3. An improved method for the inspection of castings as set forth in claim 1, wherein following the cold water rinse subsequent to the hydrofluoric acid bath the casting is immersed in hot water before immersion in the chromic acid-nitric acid bath.

4. An improved method for the inspection of castings as set forth in claim 1, wherein the chromium complexing dye solution is at a temperature in the range of 110° to 130° F.

5. An improved method for the inspection of magnesium alloy castings for imperfections which comprises immersing the casting in an aqueous solution of sulfuric acid of from 4 to 5% by volume of 66° Baumé sulfuric acid, rinsing the casting with water, immersing the rinsed casting in an aqueous solution of hydrofluoric acid of from 15 to 20% by weight of acid, rinsing the casting with water, heating the casting in hot water, immersing the casting in an aqueous solution consisting of from 24 to 33⅓% by weight chromic acid and of from 0.5 to 1.5% by weight nitric acid based on the weight of water used, rinsing the casting gently, immersing the casting in a warm bath of chromium complexing dye, allowing a colored precipitate to form as a result of the reaction between the chromic acid-nitric acid solution and the chromium complexing dye, rinsing in cold then hot water, drying the casting and inspecting the casting for the colored precipitate which would mark said imperfections.

6. An improved method for the inspection of castings as set forth in claim 5 wherein the sulfuric acid treatment lasts for from 20 to 40 seconds, the hydrofluoric acid treatment from 2 to 3 minutes, the chromic acid-nitric acid treatment from 2 to 3 minutes, the dye immersion from 45 seconds to 1 minute, and wherein the dye is methylene blue.

References Cited in the file of this patent

UNITED STATES PATENTS

| | | |
|---|---|---|
| 2,007,285 | Schauffele | July 9, 1935 |
| 2,499,577 | Fine et al. | Mar. 7, 1950 |
| 2,806,959 | De Forest et al. | Sept. 17, 1957 |

FOREIGN PATENTS

| | | |
|---|---|---|
| 224,242 | Switzerland | Feb. 1, 1943 |